Figure 1:
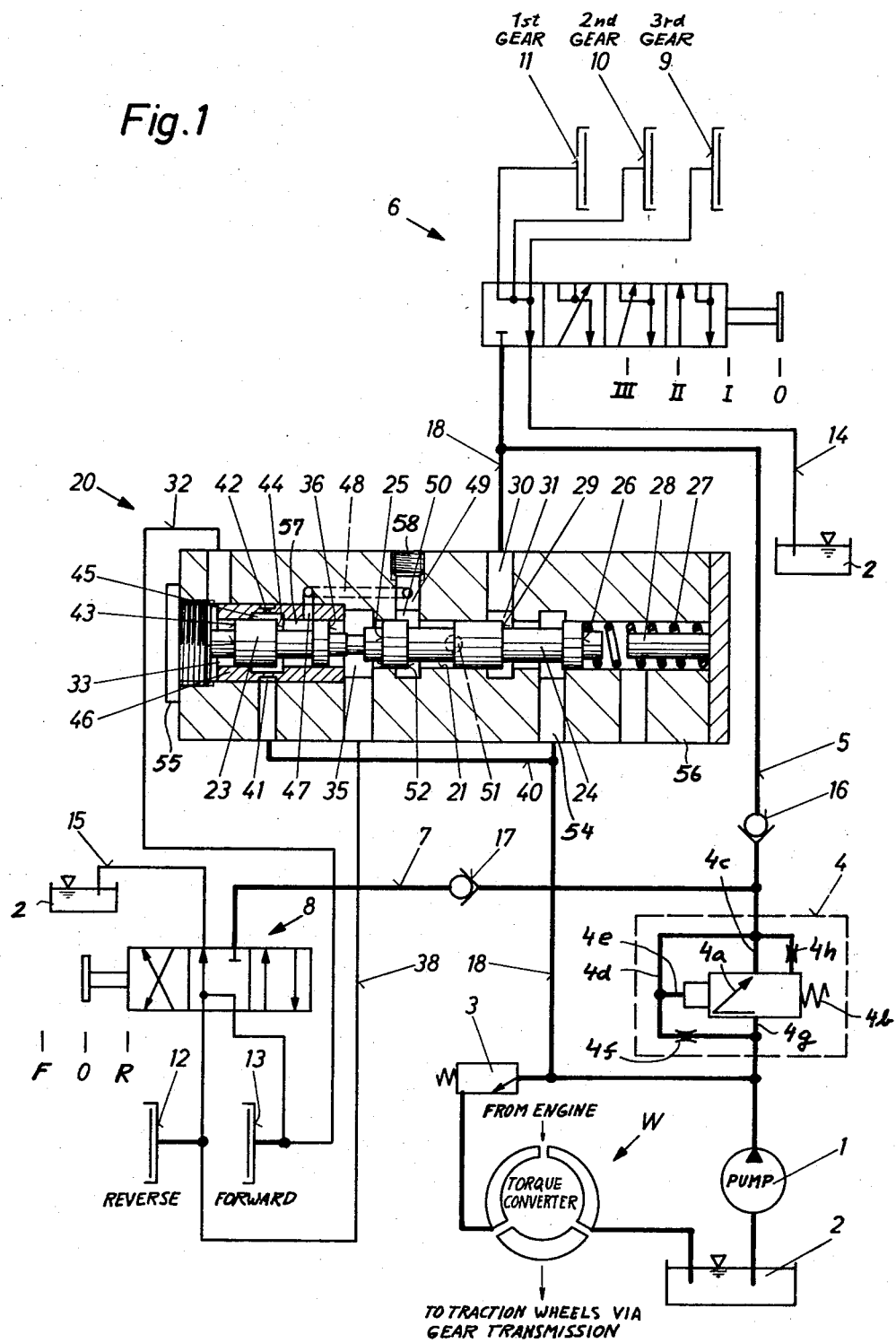

United States Patent [19]
Leber et al.

[11] 3,719,102
[45] March 6, 1973

[54] CONTROL SYSTEM FOR HYDRAULIC CLUTCHES OF REVERSIBLE GEAR-SHIFT MECHANISM

[75] Inventors: Fritz Leber; Karl-Gottfried Seumel, both of Friedrichshafen; Gunther Mohrle, Ailingen-Berg, all of Germany

[73] Assignee: Zahnradfabrik Friedrichshafen Aktiengesellschaft, Friedrichshafen, Germany

[22] Filed: Feb. 28, 1972

[21] Appl. No.: 229,862

[30] Foreign Application Priority Data

Feb. 27, 1971   Germany................P 21 09 371.0

[52] U.S. Cl. ........................74/364, 74/740, 192/3.57
[51] Int. Cl. ..............................................B60k 21/00
[58] Field of Search................74/740, 364, 745, 360; 192/3.57, 87.13

[56] References Cited

UNITED STATES PATENTS 3,091,976   6/1963   Johnson et al..........................74/364
3,181,385   5/1965   Siler........................................74/364
3,198,027   8/1968   Ramsel et al...........................74/364

Primary Examiner—Benjamin W. Wyche
Attorney—Karl F. Ross

[57] ABSTRACT

A hydraulic gear-shift mechanism for an automotive vehicle includes several gear clutches for the establishment of different speed ratios and a pair of directional clutches for choosing between forward and reverse drive. Both sets of clutches are actuatable by way of a pressure-responsive throttle valve, via respective selectors, yet in the neutral position of the directional selector a bypass is opened for the direct actuation of a selected gear clutch at high pressure. The closing of the bypass is controlled, in response to the back pressure from either directional clutch, by a blocking piston in a cylinder also containing a switching piston which responds to the same back pressure to direct supplemental oil from a branch of the bypass to the actuated directional clutch in order to compensate for leakage losses.

7 Claims, 3 Drawing Figures

CONTROL SYSTEM FOR HYDRAULIC CLUTCHES OF REVERSIBLE GEAR-SHIFT MECHANISM

Our present invention relates to a hydraulic gear-shifting mechanism for an automotive vehicle, particularly a heavy-duty vehicle such as a bulldozer or a road roller, designed to move both forward and backward with two or more speed ratios.

The traction wheels of such a vehicle can be driven from its engine with the aid of a power train including a gear-type transmission and two sets of hydraulic clutches, the clutches of one set selecting one of several speed ratios (e.g. "first," "second" and "third" gear) whereas those of the other set serve to establish either forward or backward drive. These clutches may be controlled by a speed selector or gear-shifting lever and a direction selector or reversing lever which are independently displaceable between a neutral position and several operating positions.

Upon the shifting of either selector into an operating position, the corresponding clutch can be filled with high-pressure hydraulic fluid (referred to hereinafter simply as "oil") at a rate which, advantageously, is controlled by a flow regulator such as a pressure-sensitive throttle valve retarding the build-up of the engagement pressure so as to minimize transmission shocks at the instant of cut-in. To assure a safe functioning of the clutch under maximum load, the oil pressure at the end of the shifting operation is substantially higher than that required for preventing slippage of the engaged clutch.

Upon the simultaneous actuation of a directional clutch and a gear clutch by way of a common regulating valve, e.g., when starting the vehicle from standstill, the initial load distribution depends upon such factors as the relative capacity of the two clutches and the timing of their connection to the high-pressure side of the oil pump. Frequently, the clutch of lesser capacity (usually the gear clutch) is called upon to transmit a large torque before the combined reaction pressure of both clutches is sufficient to shift their common regulating valve into its throttling position. As a result, the weaker clutch is overloaded and subject to rapid wear.

The general object of our present invention, therefore, is to provide an improved control system for the hydraulic clutches of a reversible gear-shifting mechanism of the afore-described type in which the greater part of the load falls invariably upon the stronger one of two simultaneously actuated clutches, preferably the directional clutch.

Another object is to provide means in such a system for suppressing transmission shocks under all operating conditions with the aid of a single throttle valve common to all clutches.

These objects are realized, pursuant to our present invention, by the provision of a conduit bypassing the throttle valve to form an alternate path from the source of high-pressure oil to one set of clutches, preferably the gear-shifting set; this bypass is opened in the neutral position of the selector controlling the other set of clutches, i.e., of the reversing lever in the preferred case, and is blocked upon a shifting of that selector into an operating position by a hydraulic circuit responsive to the development of a certain back pressure from the actuated clutch associated with the latter selector, this back pressure coming into existence upon incipient engagement of that clutch if the actuated clutch of the first set has already been filled sufficiently (or if the corresponding selector is in neutral).

Since the traction wheels are not driven until a clutch of each set has been actuated, the rapid filling of the first clutch without intervention of the throttle valve does not produce any transmission shocks; once the power train is established, the bypass remains blocked so that subsequent gear shifting takes place with pressure regulation.

According to a more specific feature of our invention, the blocking means for the bypass comprises a spring-loaded piston disposed in a common cylinder with a control piston, the first piston being shifted into its blocking position either directly or through the intermediary of the second piston, depending on which of the two directional clutches has been actuated. The second piston may then control, according to its position, the delivery of supplemental oil to the actuated directional clutch to replace leakage losses.

Figure 2:
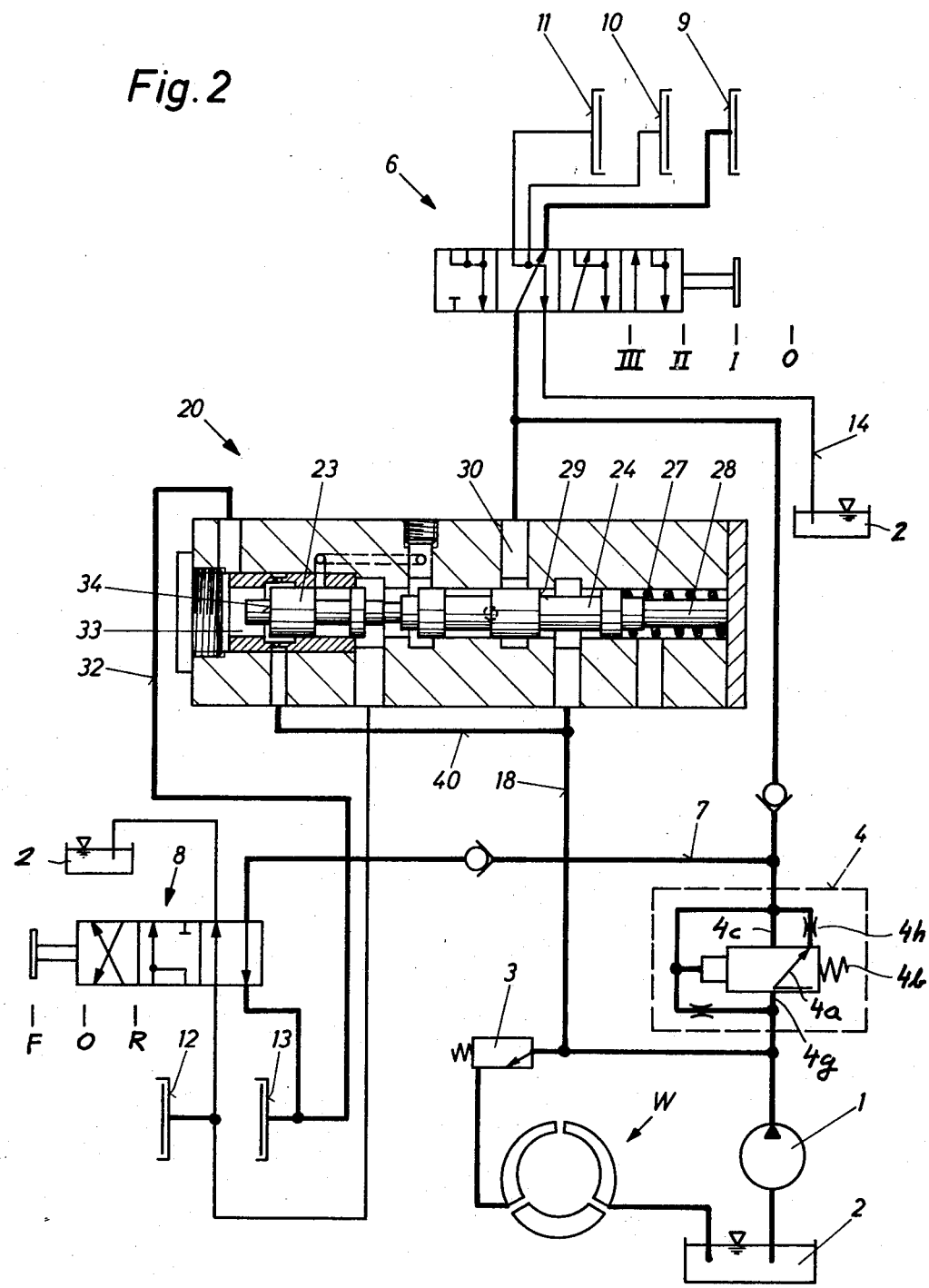
Figure 3:
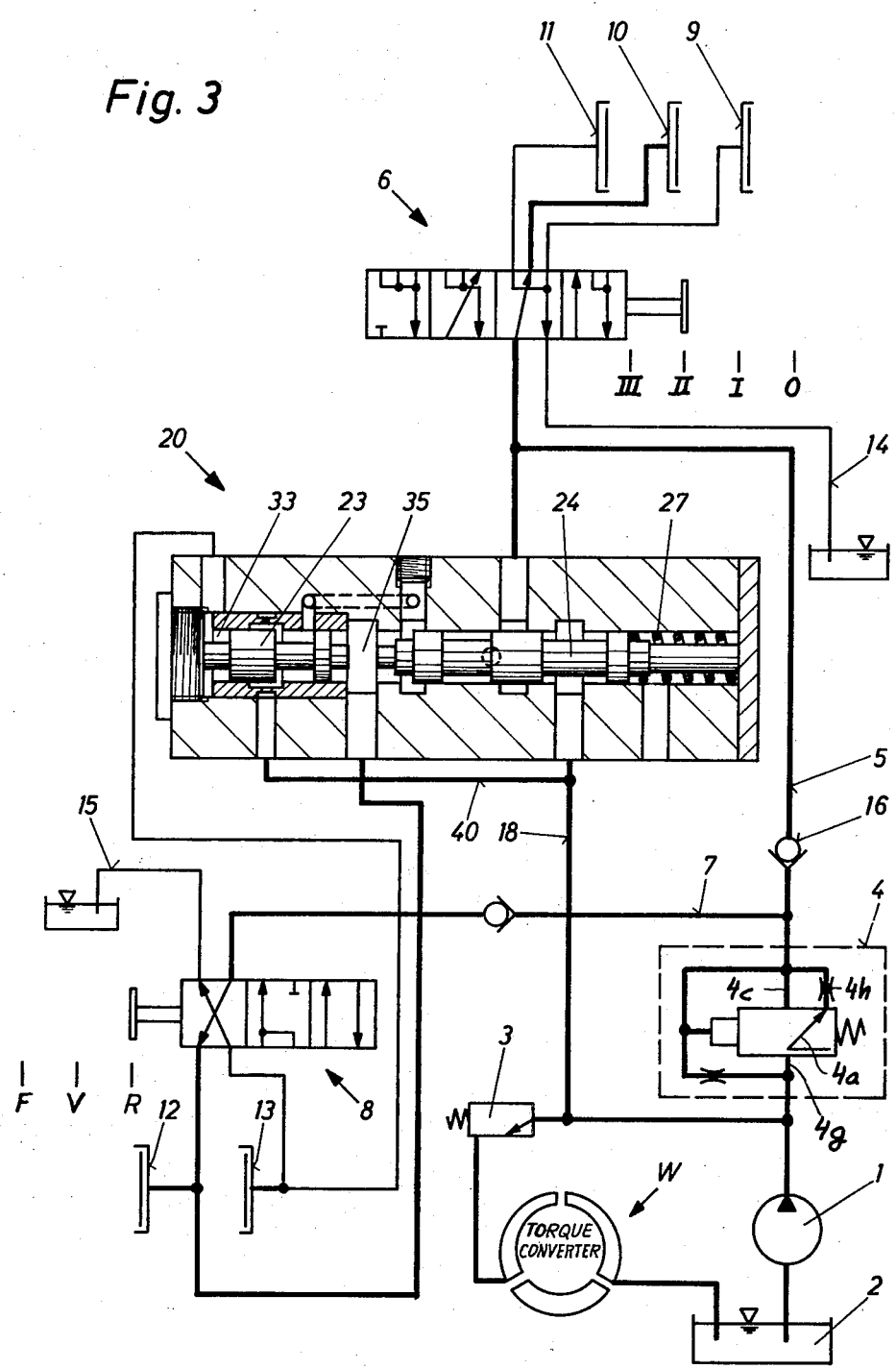

The above and other features of our invention will be described in detail hereinafter with reference to the accompanying drawing in which:

FIG. 1 is a diagrammatic view of a system embodying our invention, shown in a neutral position; and FIGS. 2 and 3 are views similar to FIG. 1 but showing the system in two alternate operating positions.

An indicated schematically in FIG. 1, the system shown in the drawing coacts with a gear transmission which couples the traction wheels of a vehicle to its engine with interposition of a hydraulic torque converter W. Oil under pressure is continuously delivered to this converter by a pump 1 via a throttle valve 3, returning to a sump 2 for recirculation. The high-pressure port of pump 1 feeds a pair of supply lines 5 and 7 through a common pressure-regulating valve 4 and two check valves 16 and 17, respectively. Line 5 leads to a speed selector 6 with a neutral position 0 and three operating positions I, II and III respectively corresponding to first, second and third gear, line 7 extending to a directional selector 8 with two operating positions F (forward) and R (reverse) as well as a neutral position (O). In its three operating positions I, II and III, selector 6 supplies oil from line 5 to three hydraulic clutches 9, 10 and 11, respectively; selector 8, when operated, actuates either of two clutches 12, 13 for forward or reverse driving.

Regulating valve 4 has a movable body $4a$ urged by a spring $4b$ into its left-hand position (FIG. 1) in which oil from pump 1 reaches its outlet $4c$ with substantially no decrease in pressure. Valve body $4a$ is also subject to the outlet pressure via a feedback loop $4d$ extending directly to a control port $4e$ of the valve housing and communicating through a throttled passage $4f$ with the valve inlet $4g$. Whenever the pressure in outlet $4c$ rises beyond a predetermined value, valve body $4a$ is repressed against the force of spring $4b$ into its right-hand position (FIGS. 2 and 3) in which inlet $4g$ communicates with outlet $4c$ only through another throttled passage $4h$.

Valve 4 is bypassed by a conduit 18 extending from pump 1 to an entrance port 54 of a control valve 20 and from an exit port 30 thereof to line 5 at a location beyond check valve 16. The path between ports 54 and 30, opened in the position of FIG. 1, can be blocked by a piston 24 in a cylinder chamber 21 formed in a housing 56 of valve 20, this piston being urged into a nonblocking position by a spring 27 bearing upon a face 26 thereof; a stop 28 limits the leftward displacement of piston 24 into its blocking position shown in FIGS. 2 and 3. This path includes an annular groove 31 which is cut off from port 54 by a land 29 of piston 24 in its blocking position. Another face 25 of blocking piston 24 defines with a confronting land 36 of a control piston 23, in tandem with piston 23, a fluid space 35 communicating via a line 38 with the reverse clutch 12; at the opposite end of piston 23, which for manufacturing reasons is mounted in a channeled sleeve 46 at the left-hand end of cylinder 21, a land 43 defines with a plug 55 of valve housing 56 a fluid space 33 which communicates by way of a conduit 32 with the forward clutch 13. A branch 40 of bypass conduit 18 extends to a port 41 in sleeve 46 and thence via a restricted orifice 42 and an annular groove 45 to a space 57 communicating by way of a radial passage 47 and a longitudinal passage 48 with a radial duct 49. Sealed against the exterior by a threaded plug 58, duct 49 opens into an annular groove 50 which in the left-hand position of piston 24 (FIG. 1) communicates with a low-pressure port 51 leading to sump 2. A land 44 of piston 23 disconnects space 57 from groove 45 upon a shifting of that piston from its left-hand position (FIGS. 1 and 3) to the right (FIG. 2); thus, branch conduit 40 communicates with exit port 51 in the position of valve 20 shown in FIG. 1 (pistons 23 and 24 both at left), with forward clutch 13 in the position of FIG. 2 (both pistons at right) and with reverse clutch 12 in the position of FIG. 3 (pistons 23 and 24 separated).

Pump 1 may also supply a nonillustrated lubricating circuit in parallel with converter W.

The operation of the system shown in the drawing is as follows:

On standstill, or possibly during casting, selectors 6 and 8 are both in their neutral position 0. Oil now flows through the hydraulic circuits indicated in heavy lines in FIG. 1, i.e. from pump 1 through converter W and in parallel therewith through bypass 18 and branch 40, port 41, orifice 42, groove 45, space 57, passages 47 – 49, groove 50 and port 51 back to sump 2. Oil also fills the lines 5 and 7 up to the blocked supply ports of selectors 6 and 8. The left-hand position of valve body 4a, illustrated in FIG. 1, exists only for a brief period after the pump 1 has gone into action with the starting of the engine, being then shifted to the right-hand position of FIGS. 2 and 3. Gear clutches 9 – 11 are drained to the sump 2 by way of a conduit 14, directional clutches 12 and 13 being similarly drained through a conduit 15. Fluid spaces 33 and 35 at the ends of lines 32 and 38 are sealed against high-pressure line 40 by lands 43 and 36 of piston 23.

Let us now assume that the driver shifts into forward and first gear by displacing the selector 6 and 8, substantially concurrently, into positions I and F thereof as shown in FIG. 2.

As indicated by the heavy lines in FIG. 2, oil now flows through bypass 18 and selector 6 to clutch 9. The other two clutches 10 and 11 of this set remain connected to the sump.

If clutch 9 fills up first, either by reason of its smaller capacity or because of the shifting of selector 6 ahead of selector 8, the torque transmitted to the output shaft of that clutch is small regardless of supply pressure inasmuch as this shaft is still decoupled from the traction wheels. As soon as forward clutch 13 begins to engage, the resulting pressure rise in conduits 7 and 32 overcomes the force of loading spring 27 in valve 20 to drive the pistons 23 and 24 thereof to the right, thereby cutting off the unrestricted oil flow through bypass 18 to selector 6. At the same time the overflow via branch 40 is redirected from low-pressure port 51, which is now cut off from space 50 by a land 52 of piston 24, to fluid space 33 and thence to conduit 32 terminating at clutch 13. This action prevents any untimely return of pistons 23, 24 to their left-hand position as a result of oil leakage at the heavy-duty clutch 13. Leakage in clutch 9 is compensated by the continuing oil flow through valve body 4a and throttle 4h.

We shall now consider the case where the driver wants to shift gears without changing direction, as by moving the selector 6 to position II. With clutch 13 remaining pressurized, the position of piston 23 does not change. At the instant of shifting, the pressure in line 5 is momentarily lowered since clutch 10 is empty; owing to the presence of throttle 4h, this pressure drop is communicated via line 4d to port 4e so that spring 4b briefly moves the valve body 4a to the left, thereby rapidly filling the clutch 10 until the latter beings to engage whereupon valve 4 responds as before to throttle the oil flow through the selector 6. The brief pressure drop in line 5 has no effect upon forward clutch 13, owing to the interposition of check valve 16 in the fluid path.

If, with the system in gear, the driver wishes to change direction by operating the reversing lever to move the selector 8 to position R (FIG. 3), clutch 13 is drained so as to relieve pressure in line 32; with clutch 12 now connected to high pressure in line 7, that pressure is communicated to space 35 to drive the control piston 23 to the left. As soon as pressure in line 38 has built up sufficiently to overcome the force of spring 27, which had briefly driven the piston 24 to the left, this piston is returned to its blocking position. Branch line 40 communicates with conduit 38 to supply the leakage losses of clutch 12 in the manner described above with reference to clutch 13. The presence of check valve 17 prevents the transmission of the temporary pressure drop in line 7, upon the reversal of selector 8, to line 5.

It is to be understood that the selectors 6 and 8 could be replaced by, for example, electromagnetically controlled valves, e.g., three 3/2-way valves connected in parallel to line 5 and a 4/2-way valve connected to line 7, directing the high-pressure fluid to the respective clutches to be actuated while draining the nonactuated ones. This and other modifications, readily apparent to persons skilled in the art, are intended to be embraced within the spirit and scope of our invention as defined in the appended claims.

We claim:

1. In an automotive vehicle having traction wheels driven from an engine by way of a power train including a gear shifter provided with first hydraulic clutch means for the establishment of different speed ratios, second hydraulic clutch means for reversing the direction of locomotion, a source of high-pressure fluid for said clutch means, and first and second selector means each with a neutral position and a plurality of operating positions for respectively controlling said first and second clutch means, the combination therewith of:
- a pressure-responsive throttle valve in a fluid line between said source and said first and second clutch means;
- conduit means bypassing said throttle valve for establishing an alternate path between said source and one of said clutch means; and
- blocking means in said conduit means holding said path open in the neutral position of the selector means associated with the other of said clutch means, said blocking means being responsive to back pressure from said other of said clutch means in an operating position of the last-mentioned selector means for closing said path.

2. The combination defined in claim 1 wherein said other of said clutch means is said second clutch means.

3. The combination defined in claim 2 wherein said blocking means comprises a hydraulic cylinder and a spring-loaded piston in said cylinder.

4. The combination defined in claim 3, further comprising a control piston in said cylinder aligned with said spring-loaded piston having a first land confronting a first fluid space and a second land confronting a face of said spring-loaded piston across a second fluid space, said second clutch means including a pair of clutches respectively communicating with said first and second fluid space via conduits connected to said fluid line by way of said throttle valve in respective operating positions of said second selector means for repressing said spring-loaded piston against its loading force.

5. The combination defined in claim 4, further comprising a branch line extending from said conduit means to said cylinder for feeding supplemental fluid to the clutch of said pair pressurized in an operating position of said second selector means.

6. The combination defined in claim 5 wherein branch line forms part of a restricted overflow circuit in the neutral position of said first selector means.

7. The combination defined in claim 1, further comprising a pair of check valves in said fluid line respectively interposed between said throttle valve and said first and second selector means.

* * * * *